United States Patent [19]

Rea et al.

[11] 4,397,924

[45] Aug. 9, 1983

[54] HIGH TEMPERATURE SOLID STATE STORAGE CELL

[75] Inventors: Jesse R. Rea, Burlington; Milton Kallianidis, Brockton, both of Mass.; G. Stephen Kelsey, Nashua, N.H.

[73] Assignee: Duracell Inc., Bethel, Conn.

[21] Appl. No.: 273,797

[22] Filed: Jun. 15, 1981

[51] Int. Cl.³ .............................................. H01M 6/18
[52] U.S. Cl. .................................... 429/191; 429/199; 29/623.1
[58] Field of Search ......................... 429/191, 50, 199; 29/623.1

[56] References Cited

U.S. PATENT DOCUMENTS

| | | | |
|---|---|---|---|
| 3,558,357 | 1/1971 | Tokahishi et al. | 429/191 |
| 3,701,686 | 10/1972 | Argue et al. | 429/191 |
| 4,143,214 | 3/1979 | Chang et al. | 429/191 X |
| 4,225,656 | 9/1980 | Lunden et al. | 429/191 |
| 4,263,377 | 4/1981 | Joshi et al. | 429/191 X |
| 4,298,664 | 11/1981 | Joshi | 429/191 |

FOREIGN PATENT DOCUMENTS 56-36871  4/1981  Japan ................................. 429/191

*Primary Examiner*—Charles F. LeFevour
*Attorney, Agent, or Firm*—Ronald S. Cornell; Israel Nissenbaum

[57] ABSTRACT

A completely solid state high temperature storage cell comprised of a solid rechargeable cathode such as $TiS_2$, a solid electrolyte which remains solid at the high temperature operating conditions of the cell and which exhibits high ionic conductivity at such elevated temperatures such as an electrolyte comprised of lithium iodide, and a solid lithium or other alkali metal alloy anode (such as a lithium-silicon alloy) with 5-50% by weight of said anode being comprised of said solid electrolyte.

12 Claims, No Drawings

HIGH TEMPERATURE SOLID STATE STORAGE CELL

The invention described herein was made in the course of, or under, a contract with the U.S. Department of Energy. The U.S. government has rights to this invention pursuant to Subcontract No. 4504310 under Contract No. W-7405-ENG-48 awarded by the Department of Energy.

This invention relates to high temperature rechargeable solid state cells and particularly to such cells in which all the components thereof remain in the solid state during operation at elevated temperatures.

Totally solid state cells have, in the past, been generally considered to be primary cells since they are, as a practical matter, nonrechargeable. This lack of rechargeability can be attributed in part to the fact that solid electrolytes have relatively poor ionic conductivities, particularly at ambient temperatures, whereby discharge and recharge consume long periods of time. Primarily, however, the lack of rechargeability is due to the fact that the interfacial contact between anode and electrolyte is disrupted on recharging. The integrity of the interfacial contact must be maintained in totally solid state cells since it provides the only means for ionic conduction and therefore cell operation. Recharging of solid state cells generally results in uneven deposition of the anode metal with disruption of the vital anode-electrolyte interface and a premature end of viable cell life.

In view of the above difficulties, rechargeable cells (at ambient or elevated temperatures) have invariably contained a fluid component during the operation thereof. Such fluid components have generally taken the form of aqueous or non-aqueous liquid electrolytes in ambient temperature rechargeable cells or molten electrolytes in high temperature cells. Alternatively, in some high temperature cells the electrolytes remained solid but the anodes are in the molten state during cell operation. In any event, interfacial contact between anode and electrolyte does not present a problem in such cells.

Examples of rechargeable cells having aqueous liquid electrolytes include the common "lead-acid" and "nicad" batteries. Such cells however have relatively low energy densities when compared to cells having nonaqueous electrolytes. Examples of higher energy density rechargeable cells having high energy density lithium anodes, and particularly with titanium disulfide ($TiS_2$) (or other transition metal chalcogenides) cathodes in liquid non-aqueous organic electrolytes are described in U.S. Pat. No. 4,009,052 issued to Whittingham. Additionally, this patent as well as U.S. Pat. No. 4,060,667 issued to Askew et al. describe such cells ($Li/TiS_2$) with alkali metal halide eutectic mixtures (e.g. KCl/LiCl) as the cell electrolytes with such electrolytes being molten at the cell operating temperatures of about 400° C. The Askew et al. patent further describes immobilization of the molten LiCl/KCl eutectic by the addition of LiF. However, the LiF does not solidify the electrolyte but rather functions as a sponge-like structure to prevent undue flow of the molten electrolyte. Similarly the electrolyte described therein as being added to the anode is in a molten state within the anode.

As exemplified by the Whittingham and Askew et al. patents, the anodes are maintained as solids in cells which utilize molten electrolytes during the high temperature cell operation. Thus, for example, lithium metal anodes are constructed from alloys of the lithium with higher temperature melting materials such as aluminum, silicon, boron, etc. Such alloying of, for example, lithium with silicon or aluminum is particularly described in U.S. Pat. Nos. 3,969,139 and 4,011,372 issued to Lai and Tomczuk et al. respectively.

In high temperature rechargeable cells wherein the electrolyte such as sodium beta alumina remains solid, the anodes such as of sodium are not similarly alloyed and are accordingly molten during the high temperature operation of the cells. Thus, in the prior art rechargeable cells, either the electrolyte or the anode is fluid whereby maintaining an intimate anode electrolyte interface is never a problem.

Though completely solid state high temperature cells are described by Buzzelli et al. in U.S. Pat. No. 3,506,492, such cells, on recharging, are subject to interelectrode shorting, necessitating circumscribing the anode with a mechanical screen. Additionally, at high rates, the anode deteriorates by cracking and pitting.

It is an object of the present invention to provide a rechargeable high temperature solid state cell which remains totally solid during the operation thereof and which cell is viably rechargeable even at high rates.

This and other objects, features and advantages of the present invention will become more evident from the following discussion.

Generally the present invention comprises a solid state cell which remains totally solid during high temperature operation thereof and yet is viably rechargeable in contrast to room temperature solid state cells. The solid state cells of the present invention are comprised of lithium or alkali metal alloy anodes, a highly ionic conductive solid electrolyte which remains solid during high temperature operation of the cell, and a solid rechargeable cathode of a material such as metal oxides, metal sulfides—particularly transition metal sulfides such as titanium disulfide, and other chalcogenides. The present invention further requires that the lithium or alkali metal alloy anode have included therein from 5 to 50 weight percent of the electrolyte. Such inclusion has been found to make such totally solid state cells viably rechargeable by at least doubling the cycling capacity of cells not having such inclusion, as for example described in the Buzzelli et al. patent.

The lithium or alkali metal anode of the cell of the present invention remains solid during cell operation and is accordingly alloyed for such purpose, as described in the aforementioned patents. The alloying materials in the lithium alkali metal anode include indium, lead, tin, iron, silver, copper, aluminum, silicon, boron and other materials which substantially elevate the melting point of the lithium or other alkali metal. It is preferred that the alloying material be silicon. Though it is only necessary that the alloying material be present in amounts sufficient to raise the melting point of the lithium anode above the operating temperature of the cell, molar ratios of Li:Si of about 3.2:1 to about 4.4:1 provide sufficient lithium capacity for the anode with 3.74:1 being preferred.

The electrolyte utilized in the present invention must remain solid, not merely immobilized as in the Askew et al. patent, at the operating temperature of the cell. A preferred electrolyte having such characteristics is one comprised of LiI and $Al_2O_3$ and optionally LiOH (LLA) as described in U.S. Pat. No. 3,713,897 issued to Liang and assigned to the same assignee of the present invention, and more preferably wherein the $Al_2O_3$ has been treated with an organo-metallic lithium material (SLA) as described in U.S. Pat. No. 4,150,203 issued to Liang et al. and assigned to the same assignee of the present invention. Such materials, in contrast to the eutectic mixtures described in the Askew et al. and Whittingham patents; i.e., LiCl-KCl, do not melt under the high temperatures at which the cell is operated. As a result, containment of a molten material and the necessity for immobilizing agents are rendered unnecessary.

The cathode materials useful in the present invention must similarly remain solid at cell operating temperatures in contrast to molten cathodes such as sulfur and must also be chemically reversible. Such materials include the metal oxides described in the Buzzelli et al. patent, metal halides and chalcogenides particularly metal sulfides such as the iron sulfide commonly utilized in high temperature cells. It is preferred however that the cathode be comprised of the layered transition metal chalcogenides, particularly titanium disulfide, as described in said Whittingham patent because of the nearly 100% rechargeability possible therewith, since they intercalate lithium ions rather than fully reacting with them.

The operating temperature of the cell of the present invention is generally determined by the enhanced conductivity of the solid electrolyte engendered by elevated temperatures and is generally about 300°-500° C. A preferred operating temperature range for the cells of the present invention having the preferred SLA electrolyte is about 300° C.-350° C., at which point the SLA electrolyte attains a conductivity of about 0.1 $ohm^{-1}cm^{-1}$ which is comparable to the conductivity in ambient fluid electrolyte rechargeable cells.

The solid electrolyte inclusions within the lithium alloy anode should comprise homogeneous but contiguous dispersions within said anode and may range between 5-50% by weight with a preferred amount being about 20%. Such inclusions generally are effected by thorough mixing of the powdered components of electrolyte and the lithium or alkali metal alloy and compressing to the requisite densities.

The solid electrolyte inclusions, in making totally solid state cells rechargeable, provide the surprising benefits of enhancing delivered capacity at higher rates of discharge of, for example, 10 $mA/cm^2$ when compared to cells not having such inclusions. Additionally, cycle life under 100% depth of discharge is extended, negative electrode polarization on recharge is reduced and a higher average discharge voltage is obtained. The electrolyte inclusions surprisingly maintain electrolyte-anode interface integrity to an unexpectedly great extent.

In order to more fully illustrate the rechargeable efficacy of the cell of the present invention the following examples are presented. It is understood however that such examples are for illustrative purposes only and the invention is not limited to details contained therein. Unless otherwise indicated all parts are parts by weight.

EXAMPLE 1 (UNMODIFIED)

A cell is made with 1.6 grams of $TiS_2$ as cathode (400 mAhr capacity, based on a 1:1 mole ratio of Li:$TiS_2$), 0.8 grams of a $Li_{3.74}Si$ alloy as anode (682 mAhr capacity), and 1.4 grams of SLA electrolyte therebetween. The above materials, in powder form, are compressed together at about 100,000 psi (7030.7 $kg/cm^2$) to form a three layer cell 1.25" (3.18 cm) diameter $\times$ 0.1" (0.25 cm) height. The cell is discharged at 325° C. and delivers 200 mAhr at a 5 $mA/cm^2$ rate to a voltage cutoff of 1.0 volt.

EXAMPLE 2 (UNMODIFIED)

A cell is made as in Example 1 and is discharged at a rate of 10 $mA/cm^2$ at 325° C. and delivers 108 mAhr to the 1.0 volt cutoff.

EXAMPLE 3 (MODIFIED)

A cell is made as in Example 1 but with 0.8 grams of a 80:20 mixture of $Li_{3.74}Si$ and SLA as anode. The cell is discharged as in Example 1 and delivers 252 mAhr, a 26% increase in capacity over the unmodified cell in Example 1, despite the decreased amount of active anode material.

EXAMPLE 4 (MODIFIED)

A cell is made as in Example 3 and is tested as in Example 2; i.e., discharge at a rate of 10 $mA/cm^2$ to a 1.0 volt cutoff and delivers 230 mAhr, more than double the capacity of the unmodified cell of Example 2.

EXAMPLE 5 (UNMODIFIED)

A cell is made as in Example 1 and is cycled to essentially 100% depth of discharge at 325° C. The cell fails after 106 cycles.

EXAMPLE 6 (MODIFIED)

A cell is made as in Example 2 and is cycled to essentially 100% depth of discharge at 325° C. The cell completes 490 cycles before failure.

EXAMPLE 7 (UNMODIFIED)

A cell is made as in Example 1 but with an additional reference electrode for measuring negative electrode polarization during recharge at 300° C. After six days of continuous charge/discharge cycling at 5 $mA/cm^2$, the cell shows 0.32 volts polarization between negative and reference electrodes at the end of the charge cycle (cell voltage 2.3 volts).

EXAMPLE 8 (MODIFIED)

A cell is made as in Example 2 but with the reference electrode as in Example 7 and with the cell being cycled as in Example 7. The cell shows 0.18 volts polarization at the end of the charge to the same cell voltage.

From the above examples it is evident that the modification of the present invention of electrolyte inclusion within the anode even with reduction of active anode material provides viably rechargeable totally solid state cells with enhanced discharge capability and reduced polarization. It is understood however that the examples are illustrative in nature and that further changes and modifications in cell structure and components may be made without departing from the scope of the present invention as defined by the following claims.

What is claimed is:

1. A rechargeable solid state cell, operating at temperatures above about 300° C., comprising a solid rechargeable cathode, a solid alkali metal alloy anode, and a solid electrolyte comprised of an ionically conductive material comprised of said alkali metal characterized in that said anode contains 5-50% by weight thereof of said solid electrolyte material homogeneously dispersed therein and wherein all of said cathode, electrolyte and anode remain in the solid state during cell operation.

2. The cell of claim 1 wherein said alkali metal is lithium.

3. The cell of claim 2 wherein said solid electrolyte is comprised of LiI.

4. The cell of claim 3 wherein said solid electrolyte further comprises $Al_2O_3$.

5. The cell of claim 4 wherein said $Al_2O_3$ was treated with an organo-metallic lithium compound prior to its use as part of said electrolyte.

6. The cell of claim 5 wherein said solid electrolyte comprises 20% by weight of said anode.

7. The cell of claims 1, 2, 3, 4, 5 or 6 wherein said rechargeable solid cathode is comprised of a metal chalcogenide.

8. The cell of claim 7 wherein said metal chalcogenide is $TiS_2$.

9. The cell of claim 2 wherein said lithium is alloyed with one or more members of the group consisting of silicon, aluminum and boron.

10. The cell of claims 8 or 9 wherein said alkali metal alloy anode is comprised of a lithium silicon alloy.

11. A method of making a solid state cell with improved recharging characteristics, said cell comprising a solid lithium anode, and solid lithium salt electrolyte and a solid cathode capable of being recharged, with said cell being operated at temperatures above about 300° C. and wherein all of said anode, cathode and electrolyte remain in the solid state during cell operation, said method comprising the steps of forming a lithium alloy, then homogeneously dispersing the same material as in said electrolyte into said lithium alloy in a range of 5-50% by weight thereof and forming said anode, with said anode, electrolyte and cathode being compressed together to form said cell.

12. The method of claim 11 wherein said electrolyte is comprised of LiI.

* * * * *